United States Patent [19]

Lipták et al.

[11] 4,093,881
[45] June 6, 1978

[54] ARRANGEMENT FOR SUPPORTING WINDING ELEMENTS IN THE STATOR SLOTS OF A DYNAMO-ELECTRIC MACHINE

[75] Inventors: Gábor Lipták; Roland Schuler, both of Wettingen, Switzerland

[73] Assignee: BBC Brown Boveri & Company Limited, Baden, Switzerland

[21] Appl. No.: 715,181

[22] Filed: Aug. 17, 1976

Related U.S. Application Data

[63] Continuation of Ser. No. 566,450, Apr. 9, 1975, abandoned.

[30] Foreign Application Priority Data

Apr. 17, 1974 Switzerland .......................... 5279/74

[51] Int. Cl.² ............................................. H02K 3/48
[52] U.S. Cl. ....................................... 310/214; 310/215
[58] Field of Search ............... 310/214, 215, 177, 192, 310/194, 51, 216–219, 43

[56] References Cited

U.S. PATENT DOCUMENTS

| | | | |
|---|---|---|---|
| 1,308,064 | 7/1919 | Griffith | 310/214 |
| 2,922,058 | 1/1960 | Bacon | 310/214 |
| 2,945,140 | 7/1960 | Drabik | 310/214 |
| 3,243,622 | 3/1966 | Whittlesey | 310/214 |
| 3,444,407 | 5/1969 | Yates | 310/215 |
| 3,594,597 | 7/1971 | Kildishev | 310/214 |
| 3,780,325 | 12/1973 | Frankenhauser | 310/214 |
| 3,974,314 | 8/1976 | Fuchs | 310/215 |

*Primary Examiner*—R. Skudy
*Attorney, Agent, or Firm*—Burns, Doane, Swecker & Mathis

[57] ABSTRACT

An arrangement for supporting insulated conductor components within the slots of the stator component of a dynamo-electric machine under compression so as to inhibit vibration thereof in which included with the one or more multi-conductor coil sections in the slot is a multi-layer resilient element including at least one felt layer and at least one hard layer, the ratio of the thickness of the felt layer to the hard layer preferably being 3 : 1 and the resilient element having a spring characteristic which is degressive in relation to the spring force.

5 Claims, 4 Drawing Figures

ARRANGEMENT FOR SUPPORTING WINDING ELEMENTS IN THE STATOR SLOTS OF A DYNAMO-ELECTRIC MACHINE

This is a continuation, of application Ser. No. 566.450 filed Apr. 9, 1975 now abondoned.

The present invention relates to an improvement in the technique of securing conductor coil components in the slots of the stator element of a rotary dynamo-electric machine such that the conductors located in the slots will be braced against movement, the usual arrangement being to place the conductors under compression in the slot and securing them by means of a slot key which closes off the entrance to the slot.

The slots usually contain one or more multi-conductor coil sections which are insulated usually by means of a sheath of a synthetic resin impregnated insulating material. Due to the current flow through the conductors, the latter will be subjected to electro-magnetic forces which pulsate at double the operating frequency of the current and are directed radially inward toward the base of the slot. These forces tend to cause the conductors to vibrate.

In order to prevent mechanical damage to the conductors as a result of vibration, and which would lead to an electrical puncture of the insulation and breakdown of the machine, it is necessary to keep the amplitudes of these vibrations to a minimum as long as possible during the service life of the machine. Since even a slight deformation of the contents within the slot and especially the spring components therein utilized to subject the conductors to a compressive, bracing force is hardly avoidable during the service life, thus resulting in a reduction in the wedging force generated by the slot keys and thereby resulting in an increase in amplitude of the vibrations of the conductors, it will be appreciated that the spring components in the slot associated with the conductors play an important role.

Present day practice includes installation of one or more pre-compressed multi-conductor coil sections insulated by means of a sheath usually composed of a synthetic resin in the slot along with a spring, i.e. resilient component of some kind, and the whole being placed under compression and closed off by means of a rigid slot key. The resilient components take various shapes and have a linear spring characteristic. Dome-shaped resilient elements are disclosed in German Pat. No. 964,161, and resilient elements having a wave-shaped configuration are disclosed in published German Pat. App. DOS No. 1,463,872 and DOS No. 2,123,520.

Experience has shown that during the course of operation of the machine, the initial compressive stress, generated by a rigid slot key which exerts a wedging force, will often decrease after a relative short period of time, depending upon the design and materials utilized, thus requiring, in many instances a costly re-bracing of the slot contents in order to avoid damage to the coil sections which, of course, will vibrate at continuously increasing amplitude as the compressive force decreases. However, re-bracing of the slot contents requires the machine to be shut down and dis-assembled thus resulting in a substantial economic loss, and especially so in the case of a machine having a high output.

Weakening of the wedging forces is caused by several factors such as a closer contact during the course of operation by the various components within the slot which, at the time of their installation, had surfaces that were not completely flat or level, as well as permanent, slight deformations of the individual components placed in the slots. When resilient components are included in the slots, the usual mode employed, the permanent deformation is determined largely by these components because they account for more than 50% of the total deformation of the slot contents in the radial direction of the machine, i.e. between the base of the slot and slot entrance at the internal periphery of the stator.

Another disadvantage of the various techniques heretofore utilized for wedging in the slot contents is due to the fact that the wedging, i.e. compressive, forces are not distributed uniformly throughout the entire conductor surface but are concentrated at various spots over the contacting surface thus resulting in high specific contact pressures.

The principal object of the invention is to provide an improved structural arrangement for the conductors within the slots in which the above-mentioned disadvantages are eliminated, i.e. wherein the insulated conductor components e.g. one or more multi-conductor coil sections are secured within the slots in such manner that the amplitude of the conductor vibrations will not appreciably increase during operation of the machine, and wherein the wedging forces applied to the conductors are distributed uniformly throughout the entire surfaces thereof.

The invention solves this problem in that included in the slot with the insulated conductors and subjected to pressure in a radial direction, i.e. in the direction from the base of the slot to the slot entrance, is a multi-layer spring, i.e. resilient component which comprises at least one layer of felt and one layer of hard material, and that it possesses a spring characteristic which is degressive in relation to the applied spring force, and wherein the ratio of the thickness of the felt layer to the hard layer is preferably 3:1. That is to say, the change in thickness of the resilient component per unit of applied force decreases as the force is increased.

The invention offers the advantage that such a resilient component will possess an elasticity which remains practically constant even under continuous compression stress so that the initial bracing force applied to the multi-conductor coils in the slots will remain constant over a long period of time and that the amplitude of the vibrations, already low from the beginning, due to the spring characteristic which is degressive in relation to the spring force, and also due to the selection of the operating point, cannot increase, thus attaining a limitation for the mechanical stress of the coil insulation.

It is advantageous to use for the felt layer a composition of synthetic fibers extending in an annular and/or helical form, the advantage being that such fibers will deform in the direction of compression only, and will also deform in a uniform manner. This will accomplish an almost ideal contact pressure, in contrast to the solutions heretofore known, employing multispot pressure as, for example, in the case of corrugated, i.e. wave-shaped resilient components.

It will be particularly advantageous to cover the felt layer on both sides with one layer each of a hard fabric. Due to this arrangement, there are obtained dual working surfaces, allowing a more effective axial movement in the case where thermal expansion occurs.

The felt layer can be separated by means of at least one intermediate layer consisting preferably of synthetic rubber, the ratio of thickness of the felt layer and the intermediate layer ranging preferably from 5:1 to 3:1.

The felt layer can also be built up from several plies of felt and intermediate layers, depending upon the requirements for pressure force and resilient travel. This specific design, where even in the case of a more bulky resilient component the thickness of the felt layer will not be excessive, is advantageous because thick layers will have greater permanent deformations. A splitting-up of the felt layer is desirable, especially in the case where strong conductor wedging forces are used.

In a particular advantageous embodiment, the resilient component is located between the slot key and the multi-conductor coil, with the felt layer in contact with the insulation on the conductor coil and the hard layer in contact with the underside of the slot key. With such a design, the normally required shim beneath the key can be omitted thus simplifying the entire structure.

In the case wherein the machine slot is filled with two insulated multi-conductor coil sections, the resilient component can be placed between the two multi-conductor coil sections and/or between the base of the slot and the adjacent surface of the innermost coil section, the resilient component thereby replacing, at least partially, solid flat type spacer members customarily placed between the two coil sections and/or between the base of the slot and the adjacent surface of the innermost coil section. Such an arrangement will ensure a more uniform load transmission than is possible by use of solid type spacer members intermediate coil sections or between the innermost coil section and the base of the slot.

According to a further embodiment of the invention, at least two of the resilient components are utilized, these being superposed in the coil slot with at least one of the two hard layers facing outwardly, or both hard layers facing outwardly, i.e. in the direction of the entrance to the slot, if two resilient components are involved. The latter arrangement provides an improved axial movement in the event of thermal expansion.

The foregoing objects and advantages of the invention will become more apparent from the following detailed description of several embodiments thereof and the accompanying drawings wherein.

Figure 1:
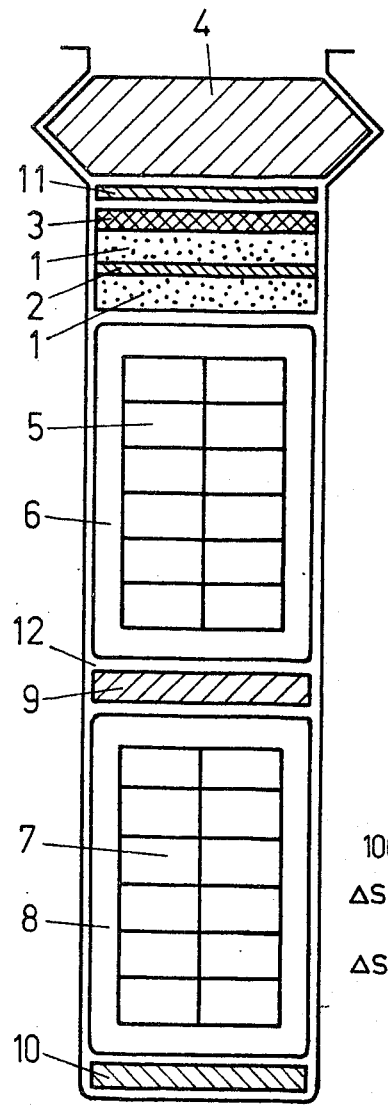
FIG. 1 is a view in cross section of a slot in the stator component of a dynamo-electric machine, and wherein the conductors in the slot are arranged in two superposed multi-conductor coil sections each of which is provided with an insulation sheath, and wherein the multi-layer resilient component comprising felt and hard layers is located directly beneath the slot key.

With reference now to FIG. 1, it will be seen that two superposed multi-conductor coil sections 5 and 7 are located in the slot 12, and each coil section is insulated by means of a sheath 6, 8 respectively. Located between the lower end of the coil section 7 and the base of the slot 12 is a flat separator member 10 made from a glass fiber-reinforced plastic, and a similar flat separator member 9 is located between the two coil sections. The resilient component in accordance with the invention is located between the upper surface of the insulated coil section 5 and the slot key 4 which is made of hard plastic, or to be more specific, between a shim 11 placed under the slot key and the insulated coil section 5. The resilient component is seen to be comprised of a hard layer 3 next to shim 11, a first felt layer 1 beneath hard layer 3, an intermediate layer 2 beneath felt layer 1 and made from a temperature-resistant synthetic rubber, and a second felt layer 1 beneath the intermediate layer 2 which is adjacent the insulation 6 at the upper side of the multiconductor coil section 5.

While the drawing shows a slight spacing between the various components located in slot 12, it will be understood that all of these components lie in surface-to-surface contact and are placed under compression by the slot key 4.

Since the width of the multi-layer resilient component 1, 2, 3 equals that of the insulation sheath 6, 8, and since the resilient component includes a hard layer 3 forming a working surface facing the shim 11, it is possible to delete the latter provided manufacturing is true to desired dimensions. The length of the resilient component should preferably correspond to the length of the slot key 4 but it is also feasible to install resilient components of greater or lesser length.

The hard layer 3 serves as a support, and primarily to facilitate insertion of the slot key 4 for bracing the coil sections 5, 7 in the slot and placing them under compression. The hard layer 3 consists preferably of a hard plastic, or a glass fiber-reinforced plastic, with a thickness preferably ranging from 0.3 to 1 mm. The felt layers 1 preferably have a thickness of from 1 to 2 mm each, with the thickness ratio of felt layer 1 to hard layer 3 preferably being 3:1. The felt proper possesses a specific spring characteristic $a$ as plotted in FIG. 4. This specific spring characteristic can be obtained, for example, by building up the felt from fine, temperature-resistant synthetic fibers in annular or helical shape. A similar matted characteristic can also be obtained by means of a special weaving or knitting method. Polyamide fibers or polyimide fibers are materials suitable for this purpose. It is important in this connection to keep down the thickness of the felt layer 1. It is therefore desirable to sub-divide this layer by one or more intermediate layers 2. Particularly suitable for use for the intermediate layers 2 is temperature-resistant synthetic rubber which will also serve simultaneously as a binder for the adjacent felt layers. The ratio of the thicknesses of the felt layer 1 and intermediate layer 2 ranges preferably from 5:1 to 3:1. If particularly strong slot-wedging forces are required it is possible to superpose several felt layers 1 and intermediate layers 2, and the intermediate layers 2 can also be reinforced by woven glass material.

The multi-layer resilient components 1-2-3 can be inserted in slot 12 intermediate the upper and lower insulated coil sections 5 and 7 to provide for a more uniform transmission of forces than can be obtained by use of a solid type separator member 9. The same holds true with respect to substitution for the solid separator member 10 between the lower coil section 7 and the base of the slot by one of the multi-layer resilient components 1-2-3.

Figure 2:
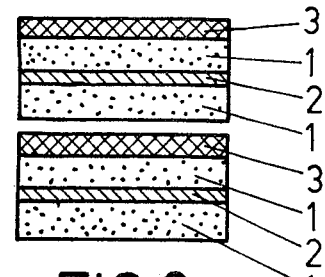
FIG. 2 is a cross-sectional view showing one arrangement of two resilient components which are superposed in the slot.
Figure 3:
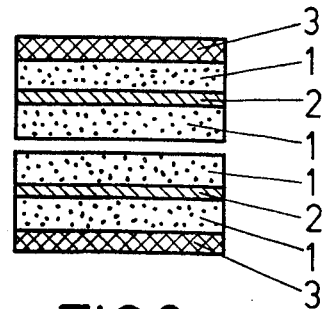
FIG. 3 is also a cross sectional view showing a different arrangement for two superposed resilient components in the slot.

In certain cases it will be advantageous to utilize two or more multi-layer resilient components 1-2-3 in the stator slot which are arranged, for example, in such manner that the hard layers 3 of the two resilient components face each other thereby obtaining an improvement in axial movements so far as thermal expansions are concerned. This is not illustrated. It is also feasible if the need arises, to arrange the two resilient components in such manner that the hard layers 3 of both components face in the direction towards the entrance to the slot 12, as illustrated in FIG. 2, or to arrange the resilient components so that the hard layers 3 thereof face in the opposite direction, i.e. one of the hard layers facing towards the entrance to the slot and the other facing towards the base of the slot, as illustrated in FIG. 3. With respect to the two or more multi-layer resilient component arrangements described, these can be located along the slot in the same general manner as has been described with respect to the embodiment shown in FIG. 1.

It is also possible to cover the felt layer 1 on both sides with a layer of hard plastic thus attaining a dual working surface.

Figure 4:
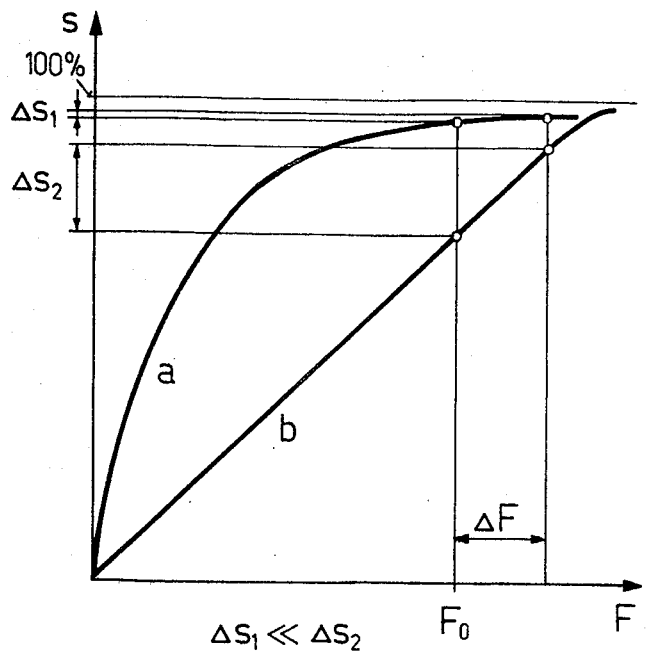
FIG. 4 is a graph showing the spring characteristic $a$ of a resilient component proposed by the invention and also the spring characteristic $b$ of a known type of resilient components.

FIG. 4 illustrates the effect as well as the advantages of the improved multi-layer resilient component in accordance with the invention. Each graph $a$ and $b$ shows the relation between the spring force F and the relative spring travel S, the maximum possible spring travel being denoted by 100%. Under identical conditions, i.e. identical magnitudes of the bracing force $F_o$ of the coil sections 5 and 6 in the stator slot and identical magnitudes of amplitude $\Delta F$ of the electro-magnetic forces produced, the multi-layer resilient component constructed in accordance with the invention, graph $a$, will permit only a slight spring travel $\Delta S_1$, i.e. permit only a lower amplitude of vibrations of the braced coil sections 5, 7 in comparison with known resilient component constructions where the spring travel $\Delta S_2$ as seen from graph $b$ is obviously substantially greater. That is to say $\Delta S_1 \ll \Delta S_2$.

The multi-layer resilient components constructed in accordance with the invention behave, because of their degressive exponential spring characteristics, substantially better over extended periods of time than do the presently known constructions. The arrangement in accordance with the invention furthermore permits one to obtain a much more effective bracing of the insulated coil section, or sections within the slot than has been possible with resilient components of presently known construction. By keeping the vibration amplitude of the coil section(s) within very narrow limits, it becomes possible to confine the dynamic-mechanical stress, thereby gaining greater safety of operation and durability.

The multi-layer resilient components in accordance with the invention and which are used to brace the winding section(s) within the stator slot can be produced more simply and economically than resilient components used for this purpose at the present time, and it is possible to adjust the spring force and spring travel, as desired, by the selection and built-up of the multiple layers.

Installation and bracing of the multi-layer resilient components within the slot is accomplished in a very simple manner because they possess, expediently, a hard working surface on at least one of their wide sides, permitting the slot key 4 to slide easily over this surface when an installation of the type illustrated in FIG. 1 is used and the solid member 11 is deleted so that the hard layer 3 of the multi-layer resilient component lies in surface contact with the underface of the slot key 4.

We claim:

1. In an arrangement for supporting insulated conductor components within the slots of the stator component of a dynamo-electric machine under compression so as to inhibit vibration thereof, and wherein a resilient element is located in the slots along with the conductor components, and the conductor components and resilient element are placed under compression by means including slot key closing off the entrance to the slot, the improvement wherein said resilient element is constituted by a planar multi-layer structure possessing a spring characteristic which is degressive in relation to the spring force and which includes at least one layer of felt adjacent a layer or hard material, the ratio of the thickness of said felt layer to said hard layer being substantially 3:1, and wherein said felt layer includes an interior layer of a synthetic rubber, the ratio of the thickness of said felt layer to said synthetic rubber layer being in the range from 5:1 to 3:1.

2. A stator slot conductor supporting arrangement as defined in claim 1 wherein said felt layer is composed of synthetic fibers having an annular shape.

3. A stator slot conductor supporting arrangement as defined in claim 1 wherein said felt layer is composed of synthetic fibers having a helical shape.

4. A stator slot conductor supporting arrangement as defined in claim 1 wherein two multi-layer resilient elements are located adjacent each other in the slot, and the hard layers of both elements face in the direction of the entrance to the slot.

5. A stator slot conductor supporting arrangement as defined in claim 1 wherein two multi-layer resilient elements are located adjacent each other in the slot, the hard layer of one of the elements facing in the direction of the base or the slot and the hard layer of the other element facing in the direction of the entrance to the slot.

* * * * *